May 13, 1941.  E. A. CUNY  2,242,058

ROTARY FLUID DISPLACEMENT DEVICE

Filed Nov. 5, 1937  5 Sheets-Sheet 1

INVENTOR
ERNEST A. CUNY

BY
Geo. M. Dowe
ATTORNEY

May 13, 1941.  E. A. CUNY  2,242,058

ROTARY FLUID DISPLACEMENT DEVICE

Filed Nov. 5, 1937  5 Sheets-Sheet 2

INVENTOR
ERNEST A. CUNY
BY
Geo. M. Dowe
ATTORNEY

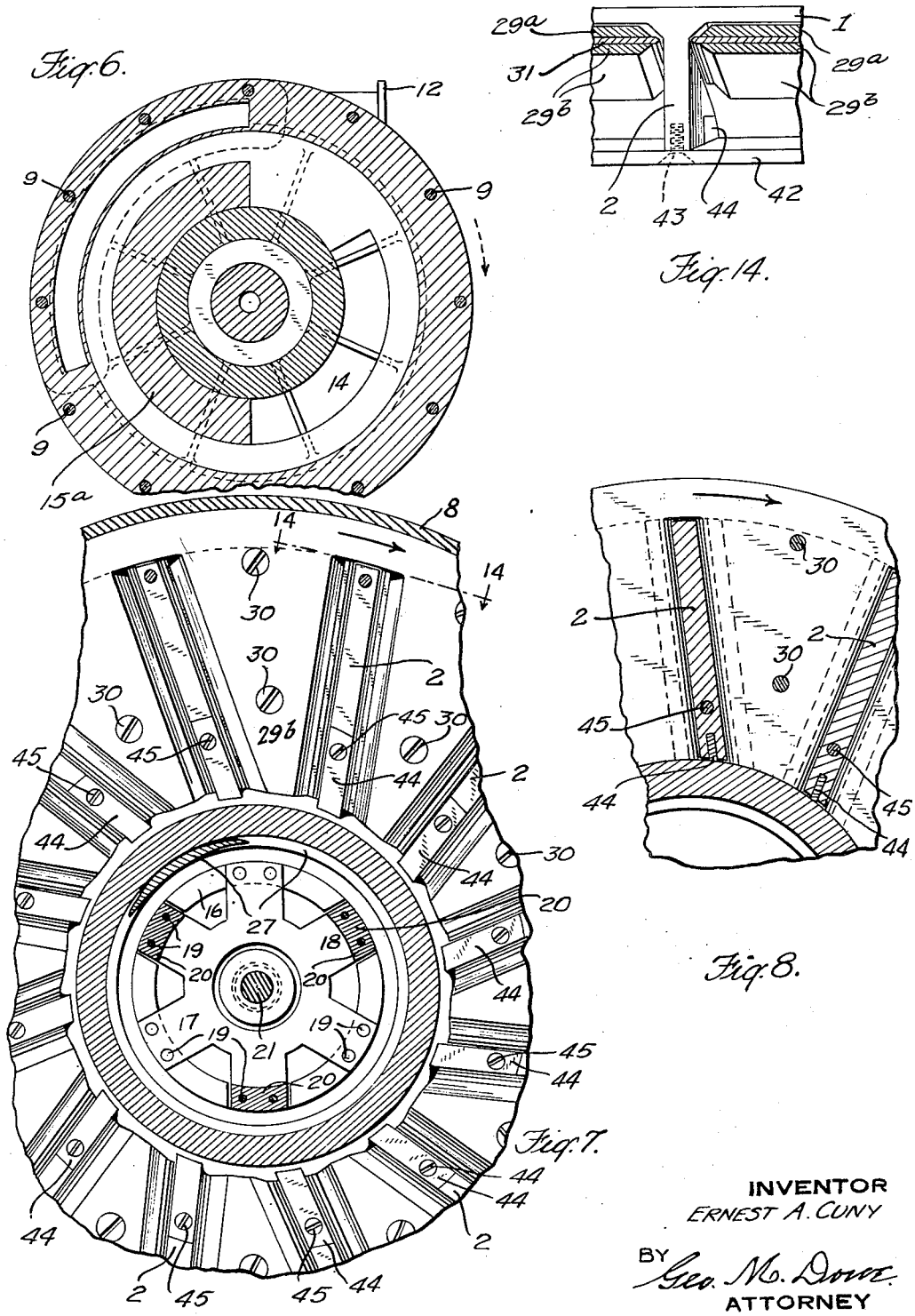

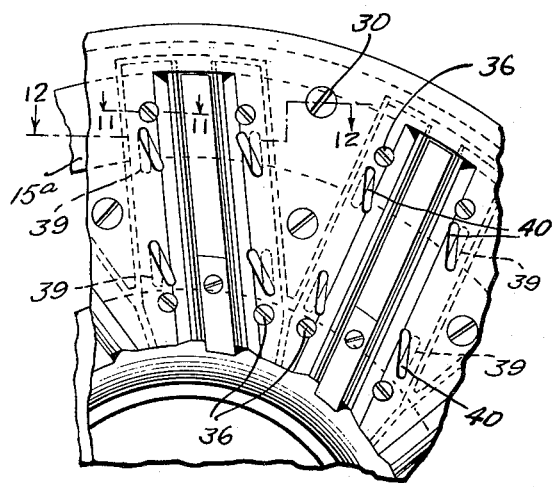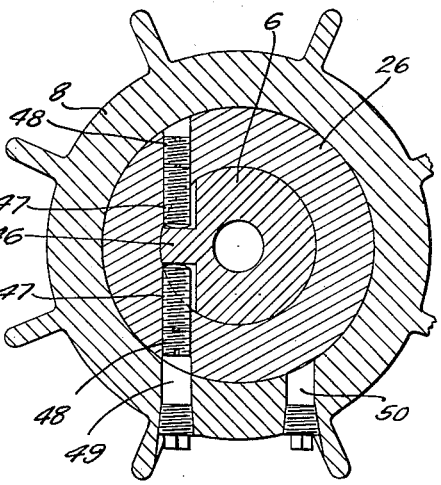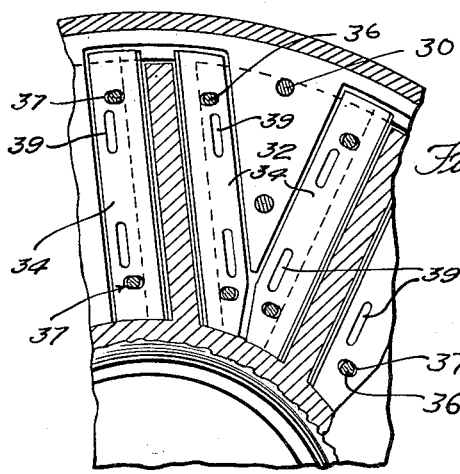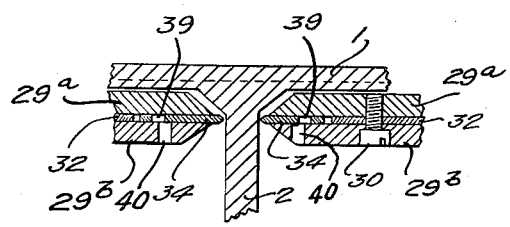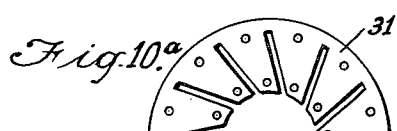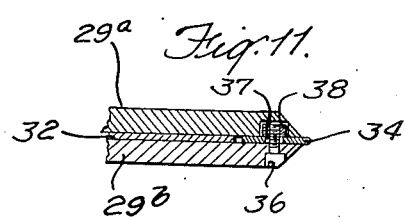

May 13, 1941. E. A. CUNY 2,242,058
ROTARY FLUID DISPLACEMENT DEVICE
Filed Nov. 5, 1937 5 Sheets-Sheet 5
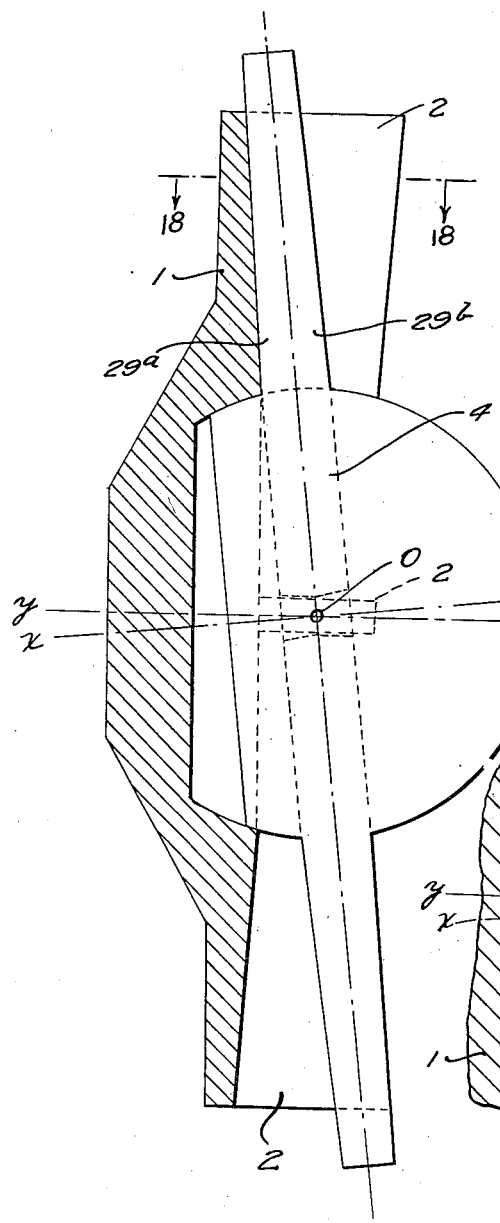
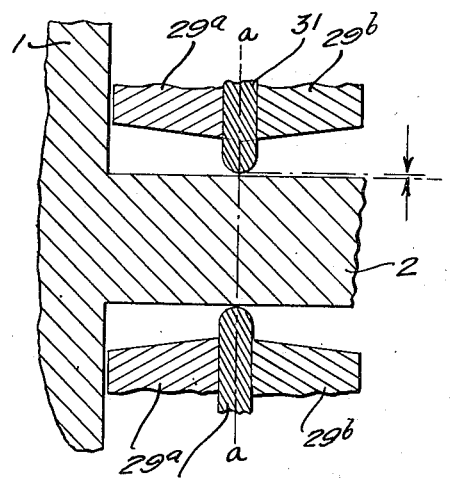
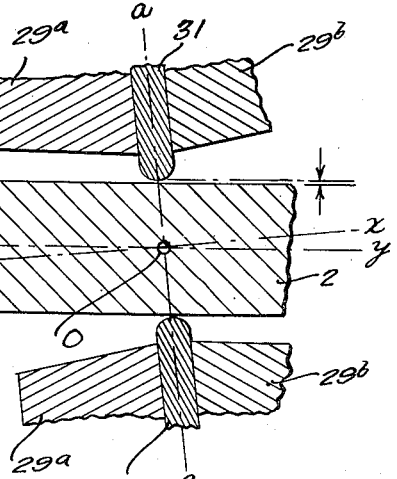
INVENTOR
ERNEST A. CUNY
BY
Geo. M. Dowe.
ATTORNEY Patented May 13, 1941

2,242,058

UNITED STATES PATENT OFFICE 2,242,058

ROTARY FLUID DISPLACEMENT DEVICE

Ernest A. Cuny, New York, N. Y.

Application November 5, 1937, Serial No. 172,969

7 Claims. (Cl. 103—127)

This invention relates to rotary fluid displacement devices and is an improvement on and in part a continuation of my applications Serial No. 19,191 and 32,371 filed May 1, 1935 and July 20, 1935, respectively, which have matured into Patents Nos. 2,101,428 and 2,101,051, respectively.

In addition to providing a device of this character having the desired characteristics set forth in the above entitled applications, such as simplicity and economy in construction and operation, a minimum of friction, noise and wear, the present invention further provides a construction in which the clearances may be extremely close and accurately determined with more effective balancing of the moving parts and in other ways making for efficiency in operation and convenience in manufacture.

The device includes two shafts whose axes are set at an angle and which are interconnected so as to be rotated the one from the other, each shaft carrying a rotor. One of the rotors is provided with a series of blades which enter into slots in the other rotor but do not touch the sides or ends of the slots at any time, clearance also being provided between the rotors and a fixed housing in which both rotate.

The housing is provided with intake and outlet ports and compression of gases or movement of liquids is brought about by variation in the capacity of the chambers as defined by the blades, rotor faces and casing.

A feature of the invention relates to two rotors, a bladed rotor and a slotted rotor mounted on intersecting axes, each rotor carried by a shaft supported solely by its bearing and a universal joint or coupling between the shafts by which they are rotated in exact synchronism, which coupling is free from frictional engaging parts and avoids torque displacement.

Since one of the objects of the invention is to provide a construction in which the clearances between the blades and slots are extremely close, another feature of the invention relates to the provision of means whereby the width of the slots in the slotted rotor may be adjusted and the clearances thereby determined with great accuracy, such clearances when the device is used as a compressor for gases, being of the order of three or four thousandths of an inch.

Another feature relates to the provision of a slotted rotor and a bladed rotor mounted on shafts whose axes intersect, the slot edges being bevelled or rounded, the center lines of the bevel or rounded portion all lying in a plane which passes through the point of intersection of said axes.

A further feature of the invention relates to the provision of means whereby one of the rotors may be adjusted circumferentially in relation to the other rotor.

Other features which make for convenience in assembly and adjustment will become apparent from the following description and claims when taken in connection with the accompanying drawings in which:

Figure 6 is a section taken on the line 6—6 of Figure 5, but on a reduced scale;

Figure 7 is a part sectional and part elevational view along the line 7—7 of Figure 5 showing a fixed slotted plate which is located between the discs constituting the slotted rotor;

Figure 8 is a fragmentary section taken on a slightly different plane from that of Figure 7;

Figure 9 is a fragmentary view similar to Figure 7 but having adjustable plates to vary the width of the slots;

Figure 10 is a view similar to Figure 9 but with one of the discs of which the rotor 4 is composed, removed;

Figure 10a is a detail view of the slotted plate 31.

Figure 11 is a section on the line 11—11 of Figure 9;

Figure 12 is a section on the line 12—12 of Figure 9;

Figure 13 is a section on the line 13—13 of Figure 5;

Figure 14 is a section on the line 14—14 of Figure 7;

Figure 17 is a diagrammatic view illustrating the principle involved in the construction of the slotted rotor;

Figure 18 is an enlarged section on the line 18—18 of Figure 17; and

Figure 19 is an enlarged view of the central portion of Figure 17.

Figures 5, 15, 16:
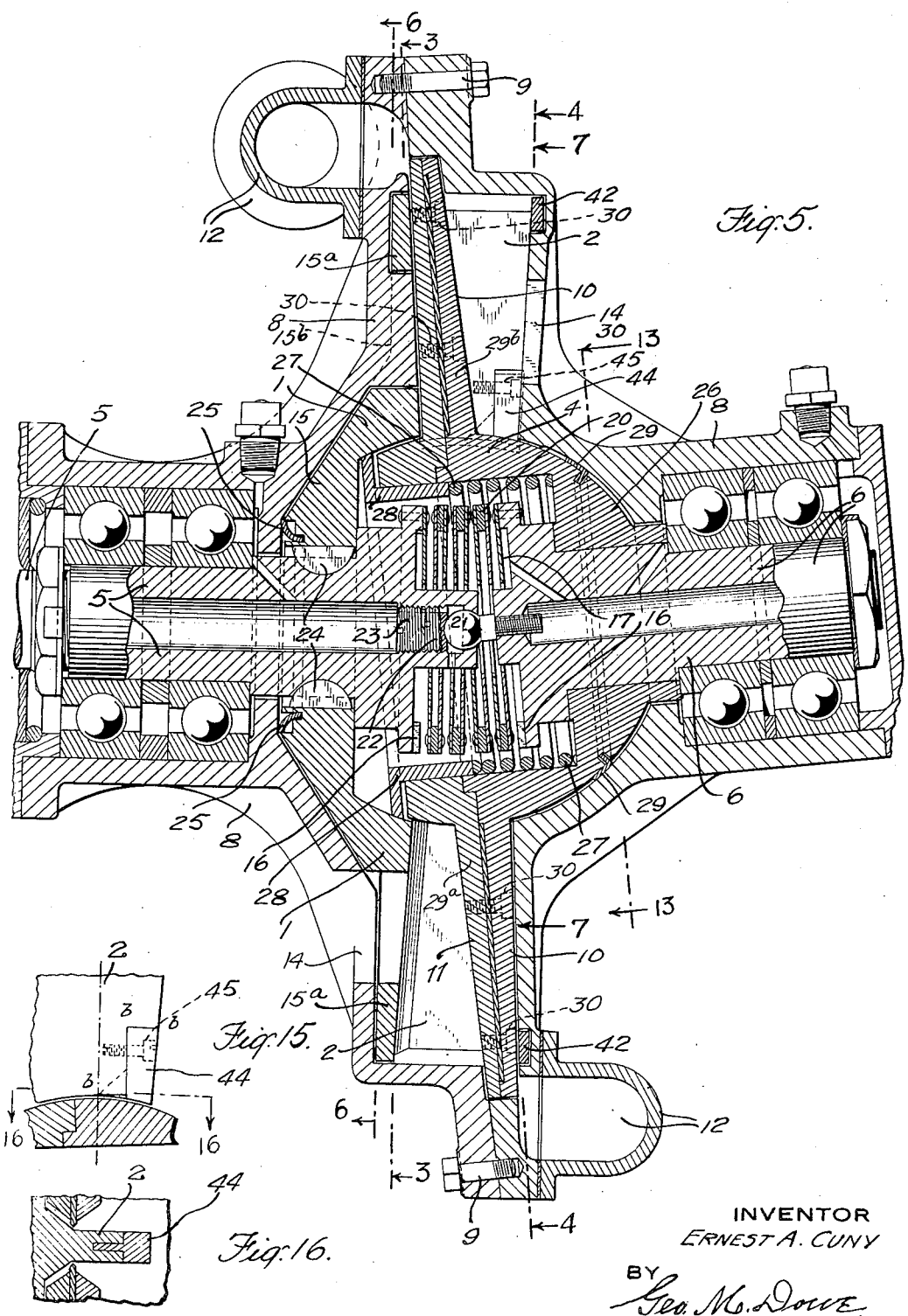
Figure 5 is a longitudinal section on the line 5—5 of Figure 1 but on a larger scale.
Figure 15 is a detail of one of the complementary blade pieces.
Figure 16 is a section on the line 16—16 of Figure 15.

Referring to Figure 5, the fluid displacement device includes a rotor 1 having blades 2 extending therefrom and a slotted rotor 4, both rotors being mounted for rotation, with their respective shafts 5 and 6, inclined to each other on intersecting axes. The rotor 1 is shown as having a cone-shaped face as a part of its hub portion and the blades 2 are perpendicular to the cone base. The face however may be flat. The two rotors are adapted to be driven simultaneously and at the same speed within a fixed casing 8 which is formed in two sections secured together by bolts 9.

The rotor 4, mounted on the shaft 6, is, for convenience in manufacture, made up of two discs whose inner faces are parallel to each other, the discs being secured together to move as one. In Figure 5 the blades 2 are shown as of such shape and size as to substantially fill the space between the face 10 of the rotor 4 in the upper part of the figure, and the side of the casing. The lower portion of the face 10, however, is in a position to substantially close the space between such face and the casing. These conditions are reversed for the other face 11 of said rotor.

Figure 1:
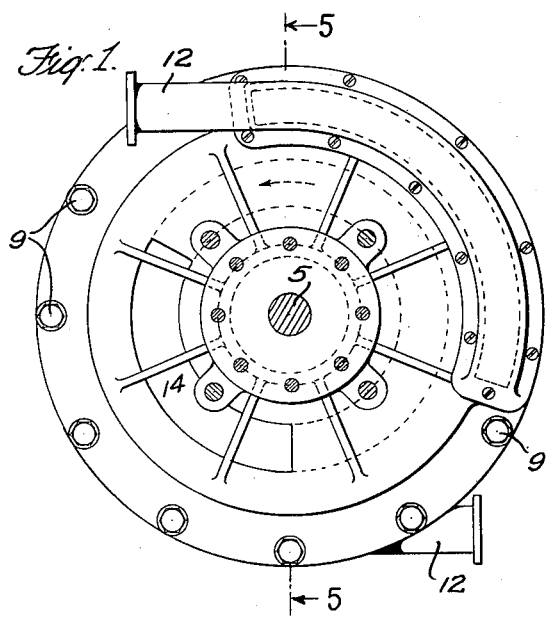
Figure 1 is an end view of the complete device looking from the left of Figure 2.
Figure 2:
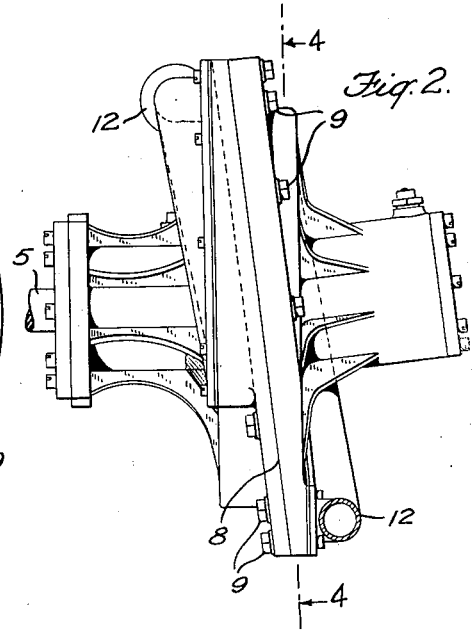
Figure 2 is a side view.
Figure 3:
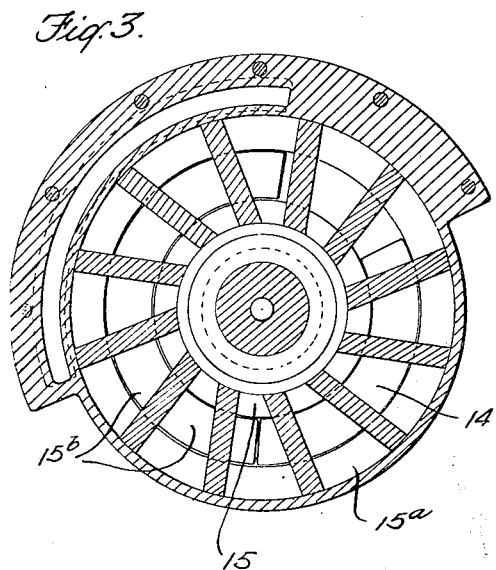
Figure 3 is a section taken on the line 3—3 of Figure 5, but on a reduced scale.
Figure 4:
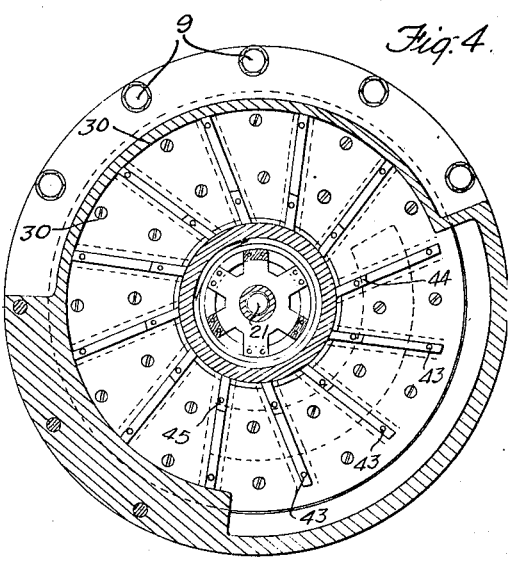
Figure 4 is a section taken along the line 4—4 of Figure 2 and also 4—4 of Figure 5 but on the scale of Figure 2.

The casing is provided with exhaust ports 12, Figures 1, 2 and 5 and intake ports 14 both of which are shown in Figure 5 and one of which is shown in Figures 1 and 3.

The rotor 1 includes a hub portion 15 and a ring portion 15a connected by the blades 2. A filling ring portion 15b is cast integral with the left hand casing section and extends through an arc of substantially 180° or sufficient to bring the compression space between the side of the casing and the face of the rotor 4 adjacent thereto, to practically a line at the point of maximum compression.

From the description so far, it will be understood that as the rotors move in synchronism the space between the face 10 of the rotor 2 and the side wall of the casing will be reduced in volume from the maximum shown at the top to the minimum shown at the lower right-hand portion of Figure 5. While the volume of the chamber on the right of the face 10 is being reduced, the space between the face 11 and the casing is being increased. As the space between two of the blades 2 comes opposite each intake 14, fluid enters into the space between the blades and is thereafter discharged through the ports 12 at that same side of the casing. Thus compression takes place both between each of the faces 10 and 11 and the casing.

Since the present invention contemplates a device in which friction is reduced to a minimum, the slots in the rotor 4 through which the blades 2 pass are of sufficient width and length to permit the blades to pass back and forth without touching at any point. Likewise the blades do not touch any portion of the casing at any time, there being sufficient clearances allowed, although these celarances are small.

In order that small clearances may be maintained during long use of the device, it is essential that the two shafts 5 and 6 are driven in perfect synchronism with no displacement due to torque and that no looseness develop which would cause vibration or cause the clearances to be reduced to a point of frictional contact. This condition is brought about by a universal joint between the two shafts whereby these results are obtained. The end of each shaft is formed with a ring 16 having radial slots milled therein (see Figures 5 and 7). The ends of the shafts are separated a suitable distance and a plurality of discs 17 are interposed between the ends of the shafts, and constitute a positive drive without any frictionally engaging surfaces. The discs 17 are flat and are provided with a plurality of radially extending arms 18, each arm being of substantial width. In Figure 7, the arms are shown as six in number, but the exact number is not essential provided there are an equal number thereof. Beginning at the right hand, Figure 5, the disc 17 has its alternate arms riveted or otherwise firmly secured to the ring 16 and within the radial slots in said ring. The other arms of said right hand ring 17 are firmly secured as by rivets 19 to the proximate arms of the next adjacent disc to the left. This disc in turn has its alternate arms secured to the proximate arms of the next adjacent disc to the left and so on through the series, the last disc to the left having its alternate arms securely fastened to the ring 16 on the end of the shaft 5. The discs 17 are spaced apart by blocks 20 between the radial arms thereof and if the two shafts 5 and 6 were in alignment all of the discs would be parallel to one another. Since the axes of the shafts intersect, however, there is a slight flexing of the arms as shown in Figure 5, but by using a sufficient number of discs they may be in substantial parallelism at small angles of divergence of the shafts. The number of discs used may be determined according to the angularity of the shafts. In the present embodiment, the shafts are shown as diverging at an angle of approximately 6°, and in this case only six discs are shown between the end discs. If the angularity of the shafts is greater, a greater number of discs may be used. Thus the flexing of the arms of each disc as the shafts rotate may be kept extremely small and therefore fatigue of the metal be reduced to a minimum.

It is to be noted that each arm is secured to a proximate arm of the next disc at two points spaced circumferentially and are rigidly fastened together by the rivets 19 passing through the ends of each arm and through the spacing blocks 20. Thus the arms are connected in such a way that there is no possibility of displacement due to torque. The discs may flex but may not be torsionally displaced. The discs 17 are centrally apertured and a gauging or centering device is provided whereby the longitudinal position of the shaft 6 with respect to the shaft 5 may be accurately determined in assembling. This gauging or centering device, however, does not transmit any motion, motion from one shaft to the other being transmitted solely through the discs 17.

Each shaft is centrally bored to a point near its inner end. In the end of the shaft 6 is screwed a member 21 of spherical shape which is adapted to contact the face of a nut 22 which engages inner threads in the bore of the shaft 5. The nut 22 is held in place by a lock nut 23. The member 21 merely touches the nut 22, this device serving merely as a gauge to determine the longitudinal position of the shafts during assembly and does not in any manner act as a transmitter of power from one shaft to the other. The two shafts are supported in ball bearings which bearings serve as a sole means of support for said shafts and transmission of power from one shaft to the other is brought about entirely through the universal joint including the discs 17. The ball bearings are of the type whereby they also act as thrust bearings.

The blade carrying rotor 1 has its hub 15 keyed to the shaft 5 as shown at 24, but there is clearance between the hub 15 of this rotor and the casing so that there is no contact between the two at any time during rotation of the two rotors. In order, however, that any lubricant used in the shaft bearing may not be transmitted to the casing, a sealing washer 25 is provided. This may be of fibre or other suitable material and introduces a very small element of friction.

The rotor 4 is not keyed to the shaft 6 but may be circumferentially adjusted thereon in a manner to be later described.

The hub portion 26 of the rotor 4 constitutes a segment of a sphere having a central recess of sufficient size to accommodate the ends of the shafts and the universal joint including the discs 17 and to provide a housing for a spring 27 bearing against a sealing ring 28 having a circumferential flange which bears against the inner face of the hub 15 of the rotor 1. The hub 26 rotates within the casing without touching it at any point, there also being clearances between the hub 26 and the rotor 1. Sealing rings 29 are provided between the hub 26 and the casing to prevent any lubricant entering the compression chambers.

It has previously been mentioned that the rotor 4 is formed of two slotted discs secured together and when assembled, acting as a single integral disc. One purpose in making this rotor in two parts is for convenience in accurately forming the slots therein. A further purpose is to allow for adjustment of the slot openings.

As shown in Figure 5 the left-hand disc 29a has an inner flat face while the adjacent face of the right hand disc 29b is formed with a depression extending from a point near the hub to a point near the outer edge thereof, said outer edge having a circumferential shoulder against which the adjacent disc bears.

Figure 7 shows in a partially broken away view, the appearance of the outer face of the right hand disc 29b of the rotor 4 as viewed along the line 7—7, Figure 5, in the direction of the arrows. The two discs constituting the slotted rotor, are secured together by screws 30. The slots in the two discs through which the blades 2 are adapted to reciprocate are made relatively wide. In order, therefore, to provide for the very close clearances desired, a circular plate 31 is interposed between the two discs 29a and 29b, this construction being best shown in Figures 10a and 14. The sides of the slot openings in the discs 29a and 29b are bevelled and the edges of the slots in the disc 31 are likewise bevelled or rounded.

The principle of operation involved in this construction is better illustrated in the diagrammatic views Figures 17, 18 and 19. Any blade which is in a vertical position as the two blades shown for instance in Figure 5, will pass through its associated slot in such a way as to be perpendicular to the line a—a joining the centers of the rounded or bevelled edges of the slot defining plate 31, (see also Figure 12). The blade, however, which is at 90° from the blade first considered will be at an angle to the line a—a as indicated in Figure 19 due to the angularity of the shafts 5 and 6. Consequently, the clearance between a blade and the slot edges of the plate 31 will be less in the Figure 19 position than in the Figure 18 position. However, due to the bevelling of the slots in the discs 29a and 29b and the bevelling or rounding of the slots in plate 31, and also to the location of the slot centers, the difference in clearance in the Figure 18 position from that shown in the Figure 19 position, is extremely small. For instance, in the Figure 18 position the clearance between the blade and the edges of the slot may be of the order of three thousandths of an inch while in the Figure 19 position, such clearances may be of the order of two thousandths of an inch. These extremely close clearances are made possible by the further fact that the center line of the plate 31 lies in a plane which passes through the point of intersection of the axes of the shafts. This is made clear by Figures 5 and 17. In the latter figure the point o represents the point of intersection of the axes x—x and y—y of the shafts. In other words the line a—a, Figures 18 and 19 is always in a plane which passes through the point o. This construction not only makes for extremely close clearances between the slots and blades but also gives a better balance to the system and practically eliminates vibration.

In some cases it may be desirable to adjust the slot openings and for this purpose the construction shown in Figures 9, 10 and 12 may be utilized. In the construction there shown the disc 31 is replaced by a spacing member 32 (see Figures 10 and 12) which member is what might be described as of inverted star shape, this shape being necessary to fit in between a series of slot adjusting plates 34, Figure 10. The plates 34 are mounted adjacent the edges of the slots in 29a and 29b and are secured in position by screws 36 which pass through circumferentially elongated slots 37 in the plates. The screws engage nuts 38, Figure 11, fitted into recesses in the disc 29a, said recesses being so shaped that the nuts 38 will not turn therein. By reason of the slots 37, the plates 34 may be moved to cause greater or less width of the slots in the rotor 4 to determine the clearance between the slot opening and the blade 2. When the proper position has been determined, the screws 36 may be tightened to cause the nuts 38 to secure the plates 34 in adjusted position. In order that the plates 34 may move to effect this adjustment, the spacing member 32 is slightly thicker than the plates 34.

In addition to the slots 37, each plate 34 also is provided with two longitudinal slots 39 (Figures 9 and 10) and the right hand disc 29b of the rotor 4, as viewed in Figure 5, is provided with oblique slots 40, which slots partially align with the slots 39, the two sets of slots serving in conjunction with a suitable prying tool as convenient means for moving the plates 34 nearer together or further apart to narrow or widen the slots as occasion may demand.

When an adjustment of the slot widths is to be made, the right hand section of the casing, as viewed in Figure 5, is removed which then gives access to the outer face of the rotor 4 which carries the oblique slots. By inserting a tool through these slots and into the slots 39 directly beneath them, the plates 34 may be adjusted.

To give additional rigidity to the blades 2, a ring 42, Figures 5 and 14, is secured to the blade ends by screws 43. Clearance between this ring and the casing is provided so that no rubbing friction of any kind occurs within compression chambers.

Due to the fact that the shafts are driven in exact synchronism through means of the particular universal joint described, which universal joint is free from rubbing friction and from any displacement due to torque, close clearances may be maintained. That is to say the blades 2 move through the slots in the rotor 4 without touching the slots at any point. There is also clearance between the rotors and the casing and between the blades and the casing. Not only does this construction produce a very efficient compressor, since the leakage losses are extremely small, but a further advantage is obtained. It is frequently desirable to compress gases or to pump liquids which might act with corosive effect upon the metal of which the rotors, blades and casing is composed. In the present device, due to the clearances referred to, the inner walls of the casing, the blades and rotors may be plated or coated with a protective medium which will prevent the corosive effect, but which medium might not withstand rubbing friction. On the scale of the drawings it is impossible to show a coating such as might be used, but as a basis for a claim or claims to this feature, it is to be understood that the surfaces referred to are so coated.

It is desired that the portion of each blade adjacent the hub portion 26 of the rotor 4 shall conform to the shape of said hub portion. However, in order that the parts may be assembled it is necessary to cut away a part of the inner end of each blade along the irregular line b—b—b, Figure 15 and after the parts are assembled, insets 44, to fill out the cutaway portions, are secured to the blades by screws 45. These insets are also shown clearly in Figure 7 and in detail in Figures 15 and 16.

Mention has been made of the fact that the shaft 6 and the rotor 4 are not made fast to each other and that circumferential adjustment is provided. The means to accomplish this is shown in Figure 13. The shaft 6 is recessed for a short distance to provide a projecting tongue 46 against which screws 47 passing through the hub 26 may bear. By moving these screws one way or the other the hub 26 in which said screws are threaded, may be rotated with respect to the shaft 6. Set screws 48 serve to lock the screws 47 in place after they have been adjusted. The casing 8 is apertured at 49 and 50 in order that access may be had to the screws 47 and set screws 48, these apertures being closed by screw plugs as shown in Figure 13. The two apertures 49 and 50 are necessary because the parts have to be turned through a 180° angle to fully complete the adjustment.

Referring to Figure 5, it will be noted that the shaft 5 is the driving shaft on which the bladed rotor is mounted. Since during compression action the blades 2 are under stress caused by the compression, the greatest strain is on the shaft 5 and not on the shaft 6, hence when the shaft carrying the bladed rotor acts as a driving shaft, there is less strain on the universal joint than would be the case if the drive were through the shaft 6.

From the previous description, it is believed that the operation of the device is apparent. It may be noted, however, that the fluid to be operated upon enters the intakes 14 on either side of the casing, which intakes extend through an arc which may vary in extent depending upon the speed at which the device is designed to be driven and the particular fluid to be operated upon. At each rotation of the shafts 5 and 6, the fluid entering the intakes 14 is compressed between the rotor 4 and the sides of the casing when the fluid is a gas.

In the case of liquids, since they are substantially incompressible, they would be discharged from the outlet ports 12 under greater pressure.

While the clearances referred to are extremely close, they have been considerably exaggerated in the drawings in order that they may be shown as such.

It should be understood that various changes may be made and that certain features may be used without others without departing from the true scope and spirit of the invention.

What I claim is:

1. In a fluid displacement device, a bladed rotor, a cooperating slotted rotor, shafts carrying said rotors, bearings forming the sole support for said shafts, the axes of the shafts intersecting, and a coupling between said shafts whereby one shaft is driven from the other, said coupling including a plurality of apertured discs having radial arms, the ends of alternate arms of one disc being rigidly connected to the ends of the proximate arms of an adjacent disc, the alternate arms of the end discs being rigidly connected to the ends of the respective shafts, and means included within the apertures of said discs for determining the longitudinal position of one shaft with respect to the other.

2. In a fluid displacement device, a bladed rotor, a cooperating slotted rotor, the blades of said bladed rotor adapted to pass through the slots in the slotted rotor with clearance at all points, means for driving one shaft from another in precise synchronism to maintain said clearance, and means for adjusting the width of the slots in the slotted rotor to vary the clearance between the slots and blades.

3. In a fluid displacement device, a bladed rotor, a cooperating slotted rotor, the blades of the bladed rotor adapted to pass through the slots in the slotted rotor with clearance at all points, shafts on which said rotors are mounted, the axes of said shafts intersecting, said slotted rotor including two discs, and means situated between said discs for adjusting the width of the slots to vary the clearance between the slots and blades.

4. In a fluid displacement device, a bladed rotor, a cooperating slotted rotor, a shaft for each rotor, said shafts so mounted that their axes intersect, means for rotating one shaft from the other in exact synchronism, the slots in said slotted rotor being of such width as to provide clearance between the slots and blades when the blades pass substantially centrally through the slots, and means for adjusting one of said rotors circumferentially with respect to the other rotor to properly center the blades with respect to the slots.

5. In a fluid displacement device, a bladed rotor, a cooperating slotted rotor, said rotors mounted on shafts whose axes intersect, means for driving one shaft from another in unison, the blades adapted to pass through the slots with clearance at all points, plates adjacent the slots in the slotted rotor, and means for adjusting the plates towards and from each other to vary the slot opening.

6. In a fluid displacement device, a bladed rotor, a cooperating slotted rotor, said rotors mounted on shafts whose axes intersect, means for driving one shaft from another in unison, in such manner that the blades pass through the slots with clearance at all points the slots in said slotted rotor being bevelled, the apex of the bevel being in a radial line with the center of rotation of said slotted rotor.

7. In a fluid displacement device, a bladed rotor, a cooperating slotted rotor, said rotors mounted on shafts whose axes intersect, means for driving one shaft from another in unison, in such manner that the blades pass through the slots with clearance at all points the blades of the bladed rotor extending perpendicular to the plane of rotation of said rotors, the slots in said slotted rotor having bevelled edges, the apex of all of said edges lying in a plane coinciding with the plane of rotation of said slotted rotor.

ERNEST A. CUNY.